Oct. 13, 1936.  O. MATHESON  2,057,157
SAWING MACHINE
Filed July 3, 1935  2 Sheets-Sheet 1
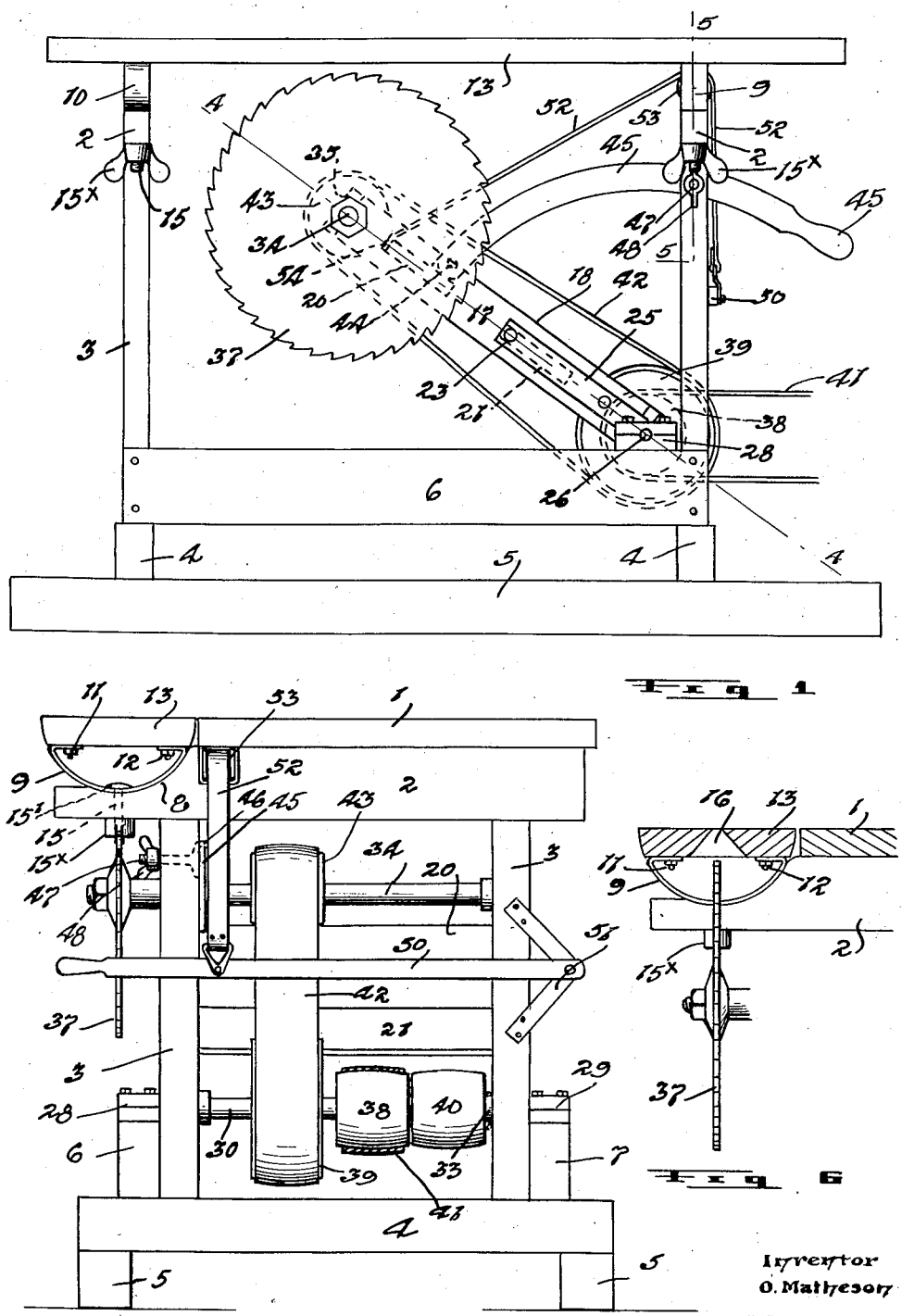
Inventor
O. Matheson Oct. 13, 1936.  O. MATHESON  2,057,157
SAWING MACHINE
Filed July 3, 1935   2 Sheets-Sheet 2
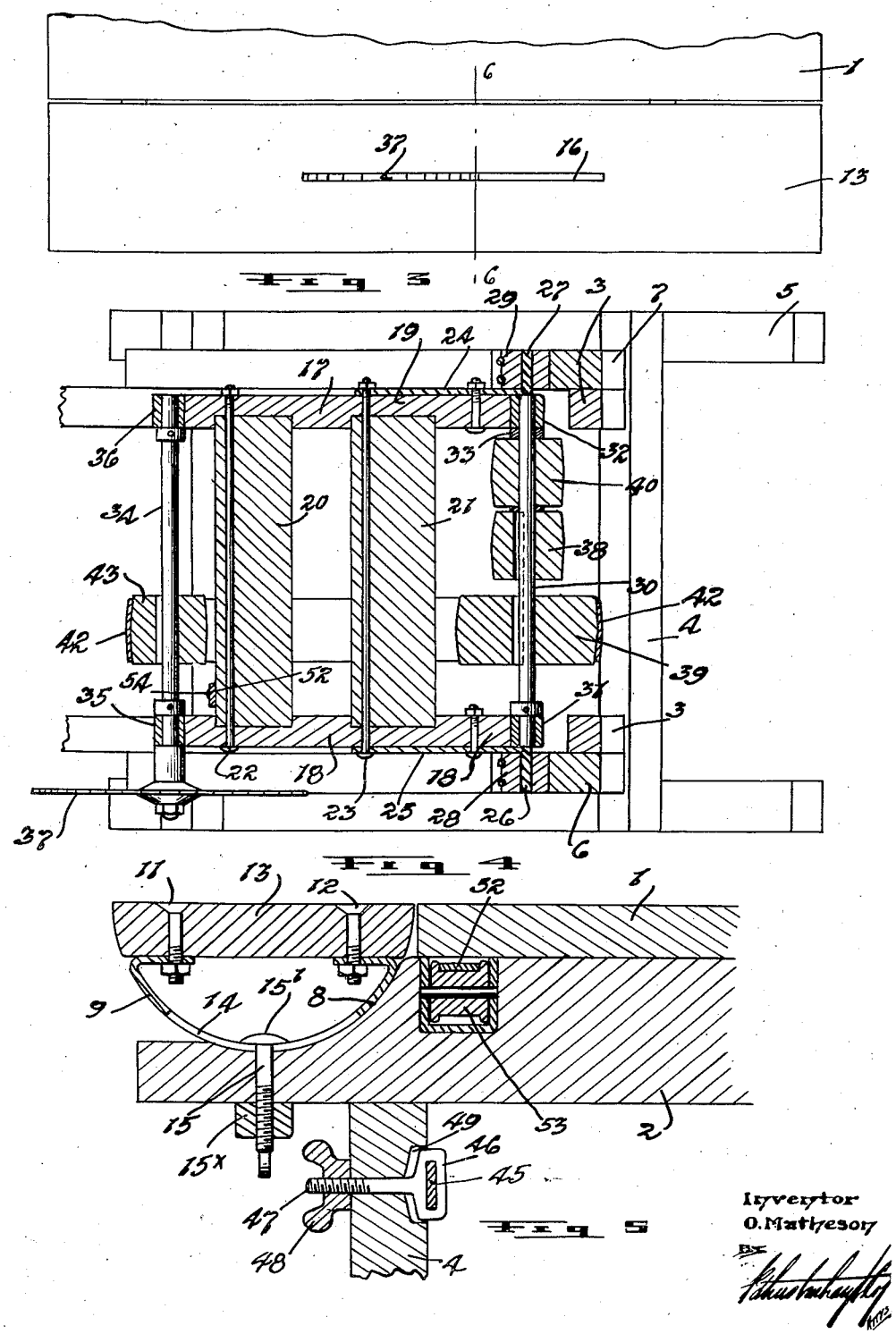
Inventor
O. Matheson Patented Oct. 13, 1936

2,057,157

UNITED STATES PATENT OFFICE 2,057,157

SAWING MACHINE

Ole Matheson, Provost, Alberta, Canada

Application July 3, 1935, Serial No. 29,743

1 Claim. (Cl. 143—35)

The invention relates to improvements in sawing machines and an object of the invention is to provide a sawing machine embodying a stationary horizontally disposed main table, a tilting table and a manually adjustable swinging saw carrying frame operating through the tilting table, such assembled parts permitting of the effective quick, easy and accurate cutting of lumber as desired.

A further object is to provide means whereby the tilting table can be readily adjusted to any required angle and effectively fastened in such position and to arrange the saw frame so that the driven saw can be swung upwardly through a suitable slot provided in the tilting table to make the cut, the swinging of the saw frame being manually controlled and provision being made also for fastening the saw frame in any adjusted position.

A further object is to arrange the machine so that the parts can be readily assembled and so that the machine can be readily mounted on a truck or similar vehicle for transporting purposes.

With the above more important and other minor objects in view which will become more apparent as the description proceeds, the invention consists essentially in the arrangement and construction of parts hereinafter more particularly described, reference being had to the accompanying drawings, in which:—

Fig. 1 is a side view of the machine.

Fig. 2 is an end view thereof.

Fig. 3 is a plan view of the tilting table.

Fig. 4 is a cross sectional view at 4—4 Figure 1.

Fig. 5 is an enlarged detailed vertical sectional view at 5—5 Figure 1.

Fig. 6 is a vertical sectional view at 6—6 Figure 3.

In the drawings like characters of reference indicate corresponding parts in the several figures.

The stationary horizontally disposed top 1 of the machine is supported by similar cross beams 2 which in turn are carried by four upright corner legs 3 rising from lower cross beams 4. The lower cross beams are secured at their ends to base beams or skids 5. Side beams 6 and 7 are mounted on the ends of the beams 4 and are secured permanently to the legs. It will be observed that the beams 2 have their ends projected at one side of the machine beyond the edge of the table and that such ends are cut to present arcuate upper faces 8.

On these arcuate faces, I mount similar semi-circular end brackets 9 and 10, such brackets having their ends inturned and fastened by bolts 11 and 12 to a tilting table 13, the bolts having countersunk heads. The brackets are longitudinally slotted as indicated at 14 and adjusting bolts 15 are carried by the ends of the beams 2 and pass through the slots, the heads 15' of the bolts overlying the slots and the lower ends of the bolts being supplied with winged nuts 15×. Obviously by releasing the bolts, one can tilt the table 13 to any desired angle, the bolts 15 at such time travelling in the slots and the brackets sliding over the arcuate faces of said beams. It will be observed that when in the horizontal position, the upper face of the tilting table is contained in the same horizontal plane as the upper face of the main table and that the inner edge of the tilting table is adjacent the edge of the main table. The tilting table is provided centrally with a longitudinally extending slot 16, the side walls of which diverge downwardly as best shown in Figure 6. This slot receives the saw later described, the V-shaped slot accommodating the saw in all tilted positions of the table.

Underneath the main table, I locate a swinging saw frame which carries a saw, the saw being positioned to pass upwardly in the up swinging of the frame into and through the slot 16, means later described being provided for raising and lowering the frame, for holding it in any adjusted position and for driving the saw in all positions.

The saw frame indicated generally by the reference numeral 17 embodies a pair of side arms 18 and 19 spaced a predetermined distance apart by intervening cross bars 20 and 21 and fastened together by long bolts 22 and 23 passing longitudinally through the intervening cross bars. To the right hand ends of the arms, I permanently secure plates 24 and 25 which are fitted with outstanding stub axles 26 and 27 rotatably received in bearings 28 and 29 carried by the beams 6 and 7. Obviously the stub axles support the saw frame for vertical swinging movement underneath the table.

A main driving shaft 30 is axially aligned with the stub shafts, being rotatably mounted in end bearings 31 and 32 mounted on the right hand ends of the side arms 18 and 19, suitable collars 33 being applied on the shaft to prevent end shifting. The saw shaft 34 is mounted in suitable bearings 35 and 36 carried by the right hand ends of the side arms 18 and 19 and on one end of the saw shaft, I firmly clamp in any suitable manner, the circular saw 37 located aforesaid so that it will move upwardly into and through the slot 16 upon the saw frame being swung upwardly.

The shaft 30 carries two fixed pulleys 38 and 39 and an idler pulley 40, the pulley 39 being considerably larger than the other two. A driving belt 41 is applied on the pulley 38 being driven from an exterior source such as an internal combustion engine and a further belt 42 connects the pulley 39 with a relatively smaller pulley 43 secured to the shaft 34. According to the above arrangement and assuming the driving belt on the fixed pulley 38, it will be seen that the saw will be driven in all adjusted postions of the saw frame. One can, of course, shift the belt 41 onto the idler pulley 40 in the usual manner to stop the driving of the saw.

To the saw frame, I connect pivotally at 44 one end of a sliding lever 45 which is curved concentric to the driving shaft and is slidably received within a flattened eye 46 formed at the inner end of an adjusting bolt 47 passing through one of the legs and provided at the exterior with a winged nut 48. A pocket 49 is formed in the leg to receive the eye and the arrangement is such that when the winged nut is tightened up, the outer face of the lever 45 is effectively jammed against the inner face of the leg. According to this arrangement, one can hold the saw frame and accordingly the saw in any adjusted position.

At the rear end of the machine, I mount a transversely extending lever 50 pivotally attached at one end to a bracket 51 secured to the adjacent leg. To the other end of the lever, I connect a strap 52 which passes over a suitable roller 53 carried by one of the side beams 2 and has the free end thereof fastened at 54 to the saw frame.

When one desires to set the saw in any elevated position, he will release the nut 48 and then shove down on the free end of the lever 50 and then subsequently tighten up the nut 48 to fasten the saw frame in its raised position. Accordingly the saw can be set in any elevated position in respect to the tilting table. If desired also, the nut 48 can be released and the saw manually raised and lowered as required by manipulating the free end of the lever 50, the saw rising through the slot 16 each time the latter lever is forced down and dropping each time the latter lever is released.

By providing the saw which can be raised and lowered as wished and set in any desired raised or lowered position and by providing the main and tilting tables as shown, I am able with this machine to do a great variety of work as will be readily appreciated by those familiar with sawing machines in general.

Various types of gauges (not herein shown) can be clamped to the tables to guide the work.

What I claim as my invention is:—

Improvements in sawing machines comprising a horizontally disposed elevated stationary main table, a tiltable table adjacent one edge of said stationary table, said tiltable table being mounted upon arcuate members provided with slots therein, and adjustable members passing through said slots, said tiltable table being provided centrally with a longitudinally extending saw receiving slot, a pivoted saw frame underlying said stationary table, a driving shaft mounted within said saw frame in alignment with the pivoted point of said frame, a saw shaft carried by the free end of said saw frame, having a rotary saw attached thereto, the plane of said saw being positioned to pass longitudinally through said slot within said tiltable table, a driving connection between said saw shaft and said driving shaft, manually operable means for adjusting the elevation of the free end of the said saw frame, to cause said saw to pass through said slot, said adjusting means comprising a strap attached to the free end of said saw frame, and a hand lever in combination with an arcuate member concentric with the driving shaft attached to said saw frame, and means for locking said arcuate member in any selected position comprising an adjustable eye for receiving said member, said eye being designed to compress said member against the frame work of said machine.

OLE MATHESON.